US010983569B2

(12) United States Patent
Lin et al.

(10) Patent No.: US 10,983,569 B2
(45) Date of Patent: Apr. 20, 2021

(54) HIDDEN HINGE AND ELECTRONIC DEVICE HAVING THE SAME

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/705,256

(22) Filed: Dec. 6, 2019

(65) Prior Publication Data

US 2020/0183464 A1 Jun. 11, 2020

Related U.S. Application Data

(60) Provisional application No. 62/776,466, filed on Dec. 7, 2018.

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
None
See application file for complete search history.

(56) References Cited

U.S. PATENT DOCUMENTS 9,677,308 B1 * 6/2017 Chen .................... G06F 1/1681
10,015,897 B1 * 7/2018 Hong .................... G09F 9/301
10,480,227 B1 * 11/2019 Chen .................... E05D 3/122
2017/0275935 A1 * 9/2017 Shang .................... E05D 3/122
2019/0166703 A1 * 5/2019 Kim .................... G06F 1/1681

FOREIGN PATENT DOCUMENTS

| | | |
|---|---|---|
| CN | 2773388 | 4/2006 |
| CN | 103453007 | 12/2013 |
| CN | 107288993 | 10/2017 |
| CN | 108266452 | 7/2018 |

OTHER PUBLICATIONS

"Office Action of Taiwan Counterpart Application", dated Jun. 17, 2020, p. 1-p. 5.
"Office Action of China Counterpart Application", dated Dec. 22, 2020, p. 1-p. 7.

* cited by examiner

*Primary Examiner* — Anthony Q Edwards
*Assistant Examiner* — Rashen E Morrison
(74) *Attorney, Agent, or Firm* — JCIPRNET

(57) ABSTRACT

A hidden hinge includes a first fixing assembly, a second fixing assembly, a first rotating part and a second rotating part, a first bearing frame, a second bearing frame, and at least one torque member. The first rotating part and the second rotating part are rotatably disposed through the first fixing assembly and the second fixing assembly. The first rotating part and the second rotating part are parallel to each other and respectively have a first teeth portion and a second teeth portion. The first teeth portion and the second teeth portion are arranged in a vertically-staggered manner. The first bearing frame is slidably disposed on the first fixing assembly and has a first rack portion engaged with the first teeth portion. The second bearing frame is slidably disposed on the second fixing assembly and has a second rack portion engaged with the second teeth portion. The at least one torque member is sleeved around the first rotating part and the second rotating part.

18 Claims, 14 Drawing Sheets

HIDDEN HINGE AND ELECTRONIC DEVICE HAVING THE SAME

CROSS-REFERENCE TO RELATED APPLICATION

This application claims the priority benefit of U.S. provisional application Ser. No. 62/776,466, filed on Dec. 7, 2018. The entirety of the above-mentioned patent application is hereby incorporated by reference herein and made a part of this specification.

BACKGROUND OF THE INVENTION

Technical Field

The invention relates to a hinge, and in particular, to a hidden hinge having a virtual rotation axis.

Description of Related Art

The existing notebook computer includes a display body, a system body, and a pivot structure. The pivot structure is configured to connect the display body and the system body, such that the display body and the system body can be unfolded or folded with respect to each other via the pivot structure. However, the existing pivot structure generally uses the pivot as the physical rotation axis, so a gap for accommodating the pivot structure has to be reserved between the display body and the system body to avoid interference in the rotation process.

Therefore, the display body and the system body of the existing notebook computer will have a gap in an unfolded state, and part of the hinge will be located between the display body and the system body and cannot be hidden, such that the unfolded notebook computer has a disadvantage of lacking aesthetics.

Accordingly, it has been one important development objective to develop a hidden hinge to improve the disadvantages of the gap and unaesthetic appearance of the display body and the system body in the unfolded state.

SUMMARY OF THE INVENTION

The invention provides a hidden hinge adapted for an electronic device, in which the gap of the electronic device in the unfolded state can be reduced and the hinge can be hidden in the electronic device to improve the aesthetics.

A hidden hinge of the invention includes a first fixing assembly, a second fixing assembly, a first rotating part and a second rotating part, a first bearing frame, a second bearing frame, and at least one torque member. Two second fixing frames are located on one side of the first fixing assembly. The first rotating part and the second rotating part are rotatably disposed through the first fixing assembly and the second fixing assembly. The first rotating part and the second rotating part are parallel to each other and respectively have a first teeth portion and a second teeth portion. The first teeth portion and the second teeth portion are arranged in a vertically-staggered manner. The first bearing frame is slidably disposed on the first fixing assembly and has a first rack portion engaged with the first teeth portion. The second bearing frame is slidably disposed on the two second fixing frames and has a second rack portion engaged with the second teeth portion. The at least one torque member is sleeved around the first rotating part and the second rotating part. The first bearing frame is adapted to slide along the first fixing assembly and drive the first rotating part, and the second bearing frame is adapted to slide along the second fixing assembly and drive the second rotating part, such that the first bearing frame and the second bearing frame are pivotally rotated with a virtual axis as a center.

An electronic device of the invention includes the following. A first body has a first space. A second body has a second space. A protective casing is aligned with the first space and the second space. Two hidden hinges are disposed in the protective casing and connects the first body and the second body, and each of the hidden hinges includes a first fixing assembly, two second fixing assemblies, a first rotating part and a second rotating part, a first bearing frame, a second bearing frame, and at least one torque member. The second fixing assembly is located on one side of the first fixing assembly. The first rotating part and a second rotating part are rotatably disposed through the first fixing assembly and the two second fixing assemblies. The first rotating part and the second rotating part are parallel to each other and respectively have a first teeth portion and a second teeth portion. The first teeth portion and the second teeth portion are arranged in a vertically-staggered manner. The first bearing frame is slidably disposed on the first fixing assembly and has a first rack portion engaged with the first teeth portion, and the first bearing frame is fixed to the first body. The second bearing frame is slidably disposed on the second fixing assembly and has a second rack portion engaged with the second teeth portion, and the second bearing frame is fixed to the second body. The at least one torque member is sleeved around the first rotating part and the second rotating part. The first bearing frame is adapted to slide along the first fixing assembly and drive the first rotating part, and the second bearing frame is adapted to slide along the two second fixing frames and drive the second rotating part, such that the first bearing frame and the second bearing frame are pivotally rotated with a virtual axis as a center to drive the first body and the second body to fold or unfold with respect to each other. When the first body and the second body unfold with respect to each other, the protective casing gradually enters the first space and the second space, such that the first body and the second body abut against each other.

Based on the above, in the hidden hinge of the invention, the first bearing frame is adapted to slide along the first fixing assembly and drive the first rotating part, and the second bearing frame is adapted to slide along the second fixing assembly and drive the second rotating part. Accordingly, the first bearing frame and the second bearing frame are pivotally rotated with a virtual axis as the center, such that the first bearing frame and the second bearing frame can be overlapped and unfolded with respect to each other.

Furthermore, the hidden hinge of the invention is configured to connect the first body and the second body of the electronic device. When the first bearing frame and the second bearing frame respectively drive the first body and the second body to unfold by 180 degrees with respect to each other, the hidden hinge and the protective casing can be hidden in the first body and the second body, and the first body and the second body can be abutted against each other to reduce the gap between the two to achieve a better narrow border display effect and improve the aesthetics of the electronic device.

DESCRIPTION OF THE EMBODIMENTS

Figure 1A:
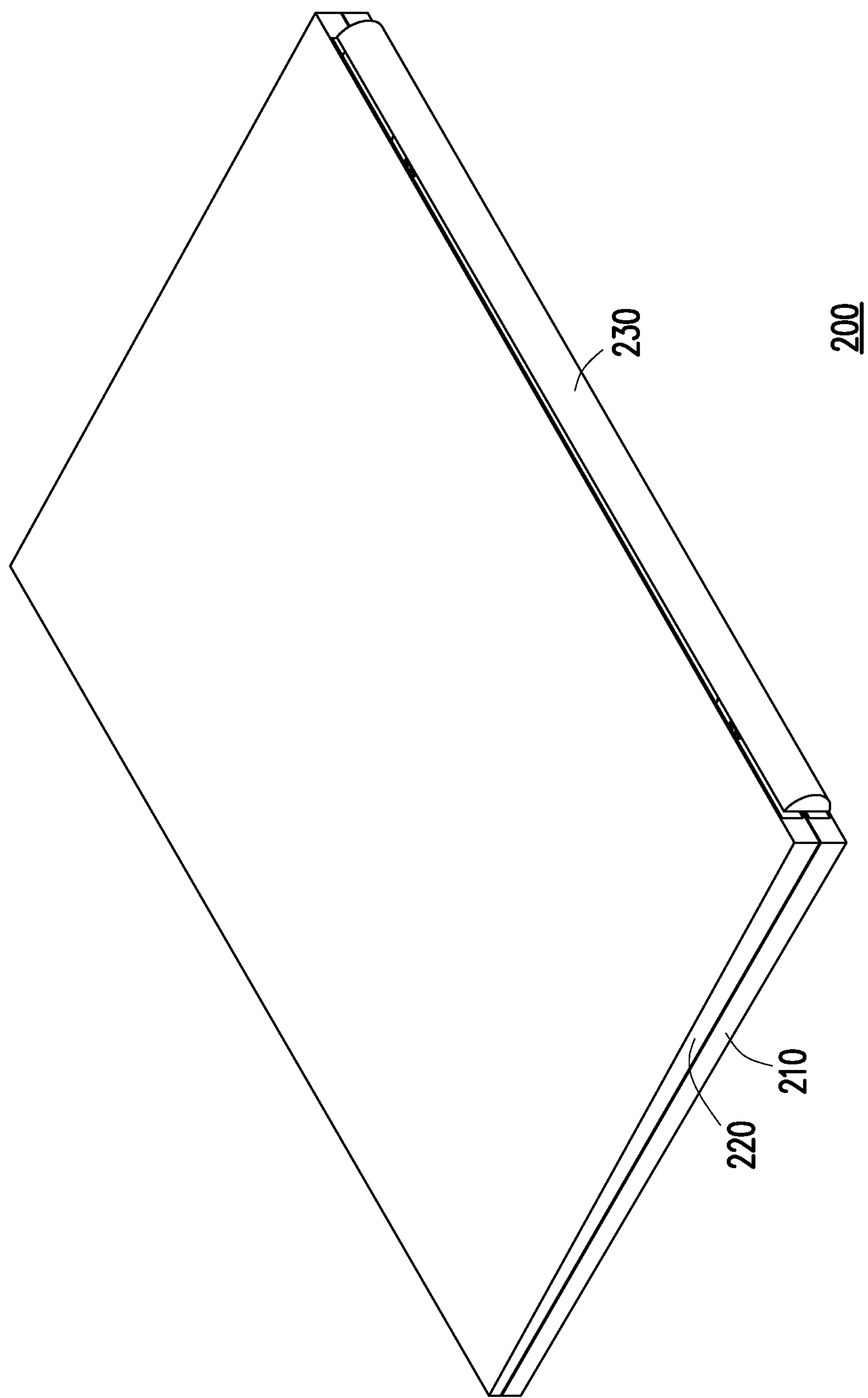
FIG. 1A is a schematic view of an electronic device in a folded state according to an embodiment of the invention.
Figure 1B:
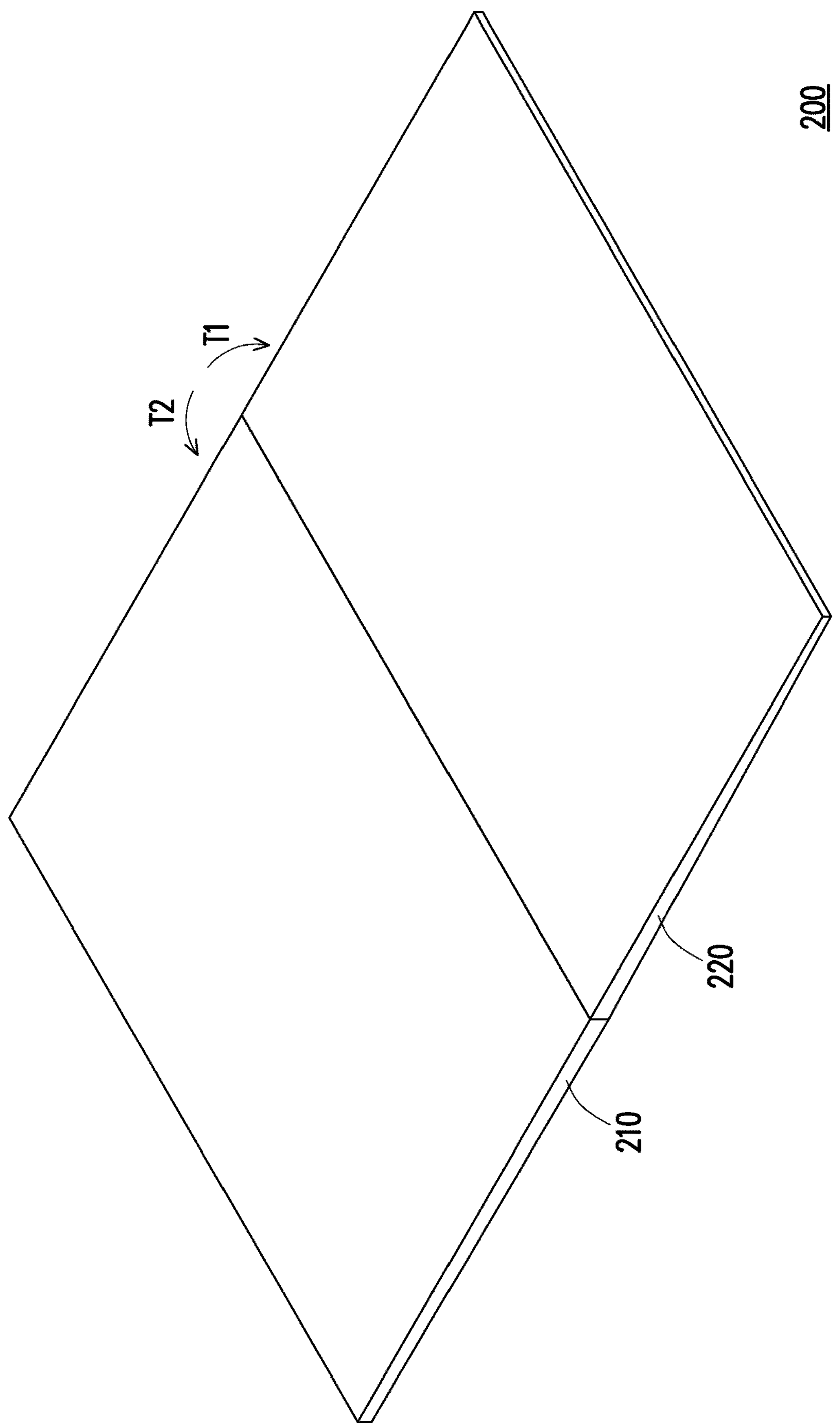
FIG. 1B is a schematic view of the electronic device of FIG. 1A in an unfolded state.
Figure 1C:
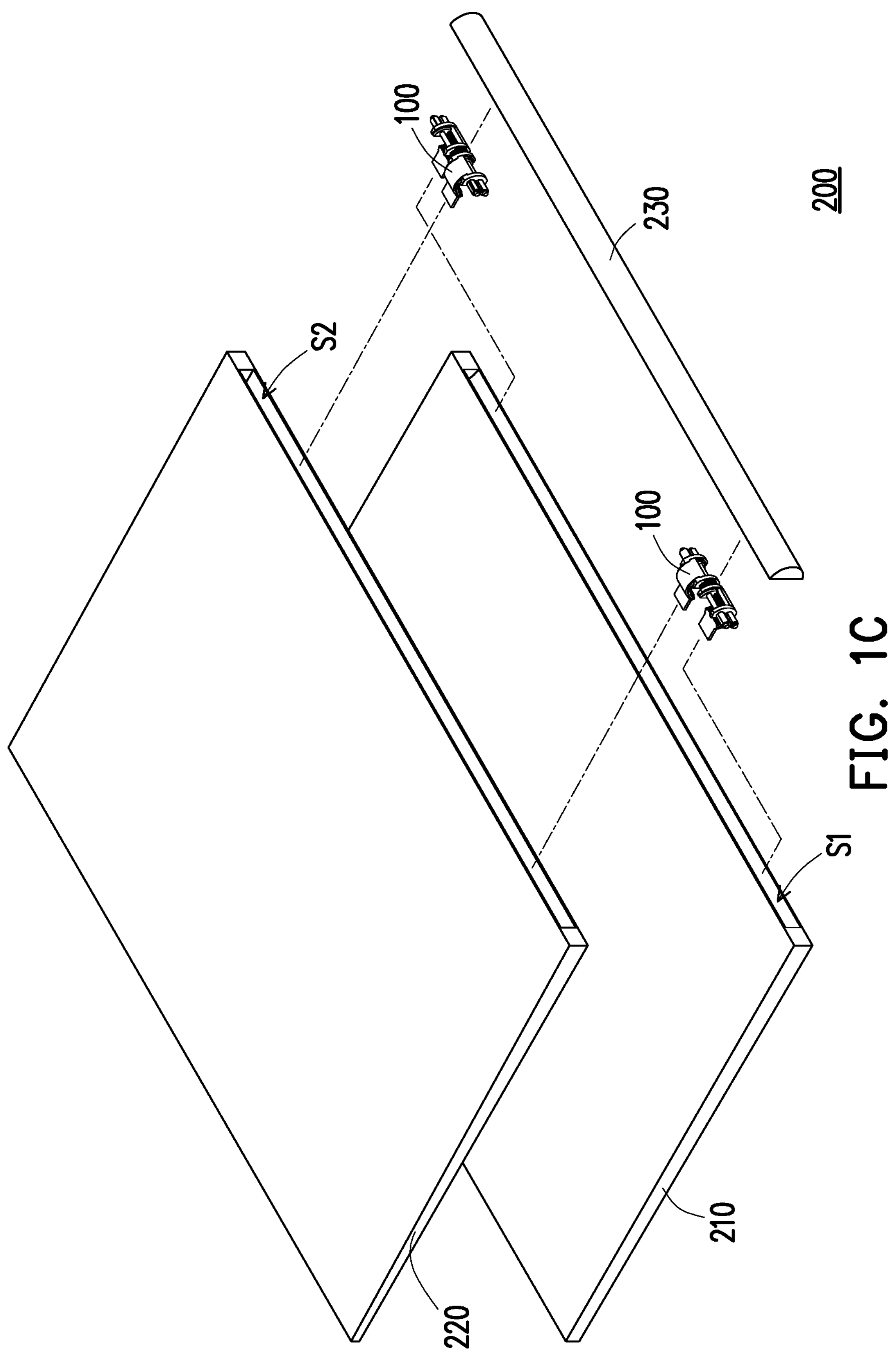
FIG. 1C is a schematic exploded view of the electronic device of FIG. 1A.

FIG. 1A is a schematic view of an electronic device in a folded state according to an embodiment of the invention. FIG. 1B is a schematic view of the electronic device of FIG. 1A in an unfolded state. FIG. 1C is a schematic exploded view of the electronic device of FIG. 1A.

Figure 2A:
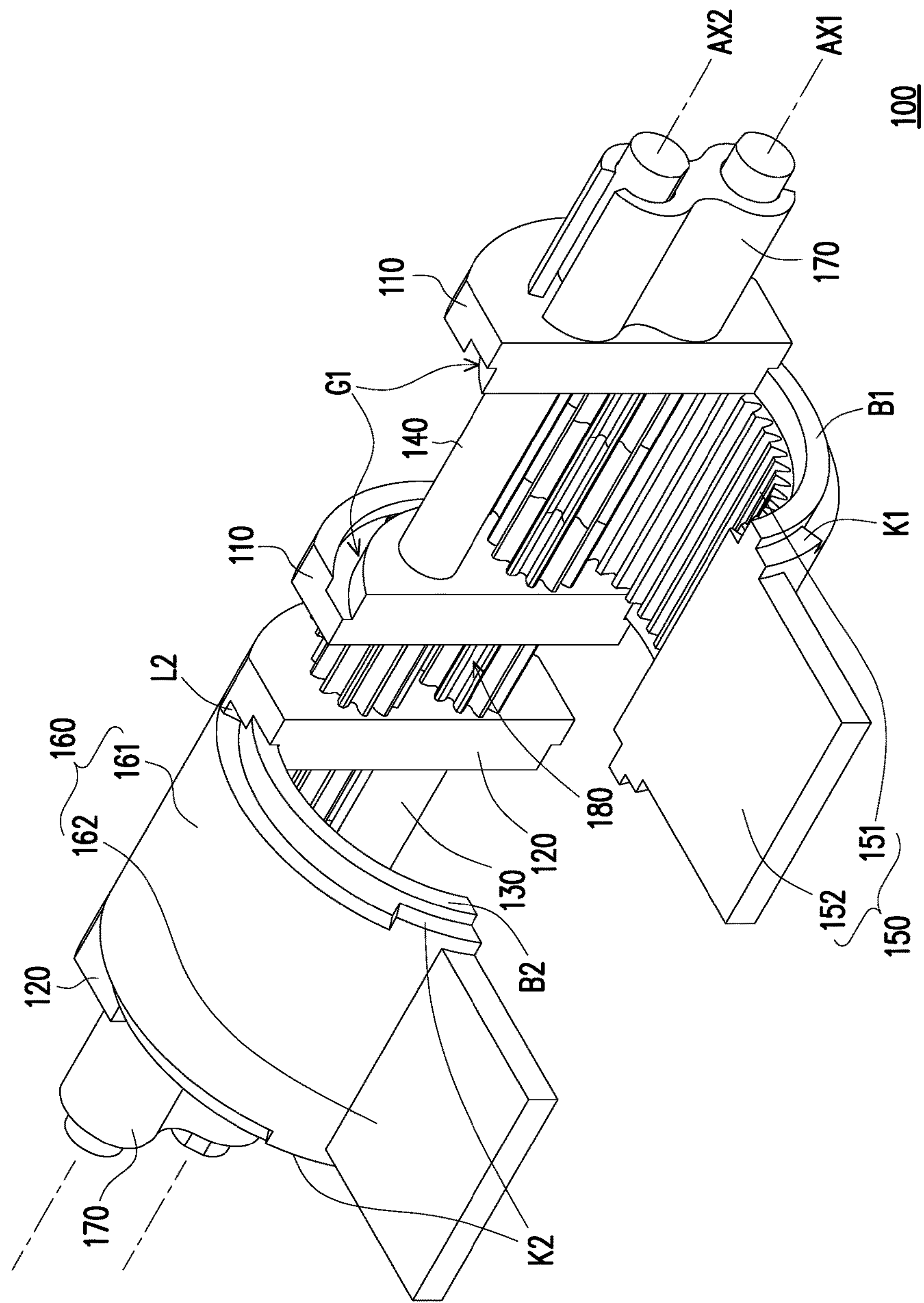
FIG. 2A is a schematic perspective view of a hidden hinge according to an embodiment of the invention.
Figure 2B:
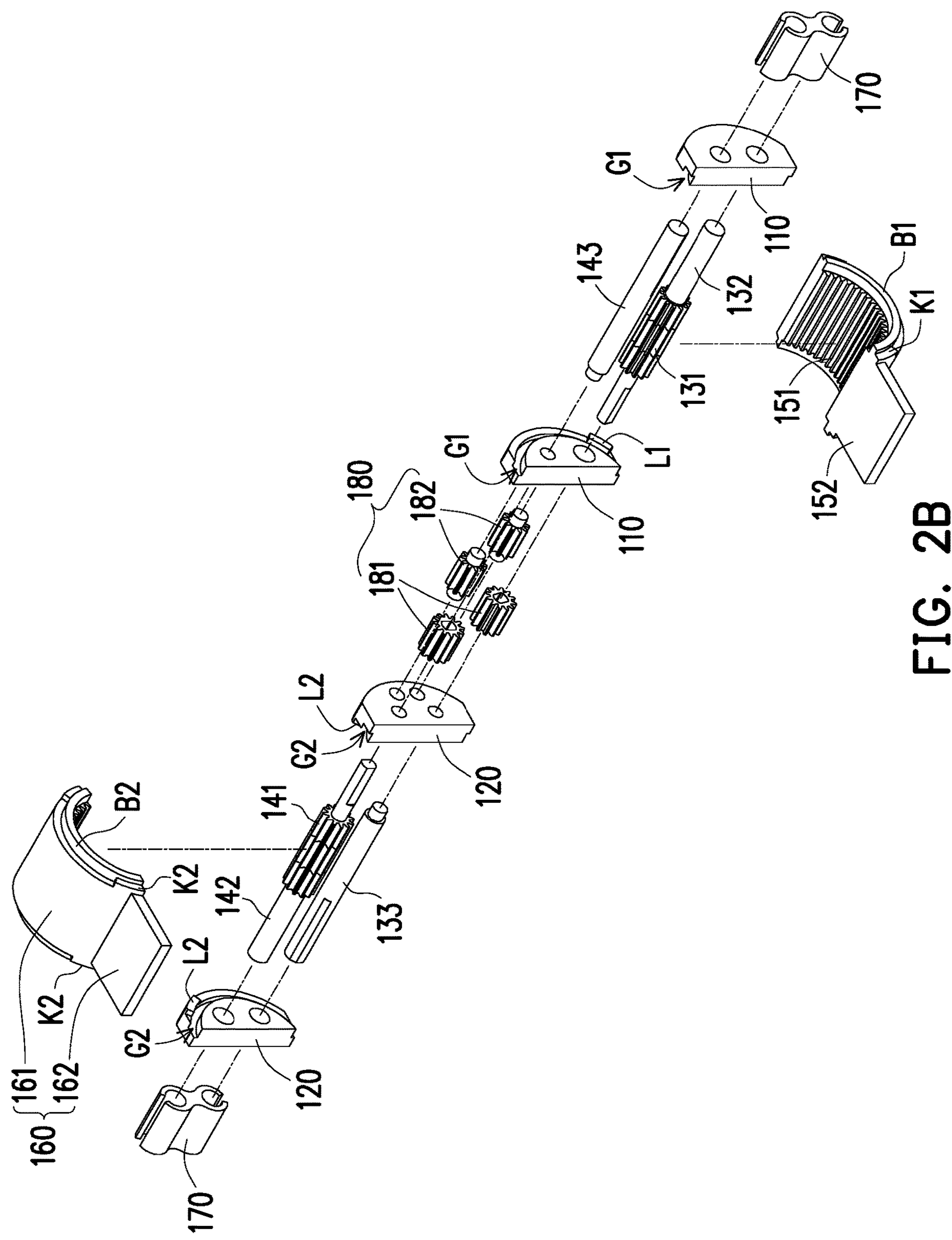
FIG. 2B is a schematic exploded view of the hidden hinge of FIG. 2A.

FIG. 2A is a schematic perspective view of a hidden hinge according to an embodiment of the invention. FIG. 2B is a schematic exploded view of the hidden hinge of FIG. 2A.

Referring to FIG. 1A to FIG. 1C, two hidden hinges 100 are adapted for use in an electronic device 200. The electronic device 200 is, for example, a notebook computer, a tablet computer, or another similar product and includes a first body 210, a second body 220, and a protective casing 230. The first body 210 has a first space S1 and the second body 220 has a second space S2. The protective casing 230 is aligned with the first space S1 and the second space S2. The two hidden hinges 100 are disposed in the protective casing 230 and connect the first body 210 and the second body 220. The first body 210 and the second body 220 may be switched to an unfolded state (see unfolding by 180 degrees in FIG. 2B) and an overlapped state (see FIG. 2A) through the two hidden hinges 100. In other embodiments, the electronic device 200 may adopt one or more than two hidden hinges 100. The electronic device of the invention is not limited to being provided with two hidden hinges, which shall depend on the torque requirement of the electronic device.

Referring to FIG. 2A and FIG. 2B, the hidden hinge 100 of the present embodiment includes a first fixing assembly, a second fixing assembly, a first rotating part 130, a second rotating part 140, a first bearing frame 150, a second bearing frame 160, and at least one torque member 170.

The second fixing assembly is located on one side of the first fixing assembly. The first fixing assembly has two first fixing frames 110 spaced apart from each other, and the second fixing assembly has two second fixing frames 120 spaced apart from each other. In other words, two first fixing assemblies 110 and two second fixing frames 120 are respectively arranged in a straight line along a first axis AX1 and a second axis AX2.

The first rotating part 130 is rotatably disposed through the two first fixing frames 110 and the two second fixing frames 120 along the first axis AX1, the second rotating part 140 is rotatably disposed through the two first fixing frames 110 and the two second fixing frames 120 along the second axis AX2. Therefore, the first rotating part 130 and the second rotating part 140 are parallel to each other and respectively have a first teeth portion 131 and a second teeth portion 141. The first teeth portion 131 is located between the two first fixing frames 110 and the second teeth portion 141 is located between the two second fixing frames 120. Therefore, the first teeth portion 131 and the second teeth portion 141 are arranged in a vertically-staggered manner.

Figure 3A:
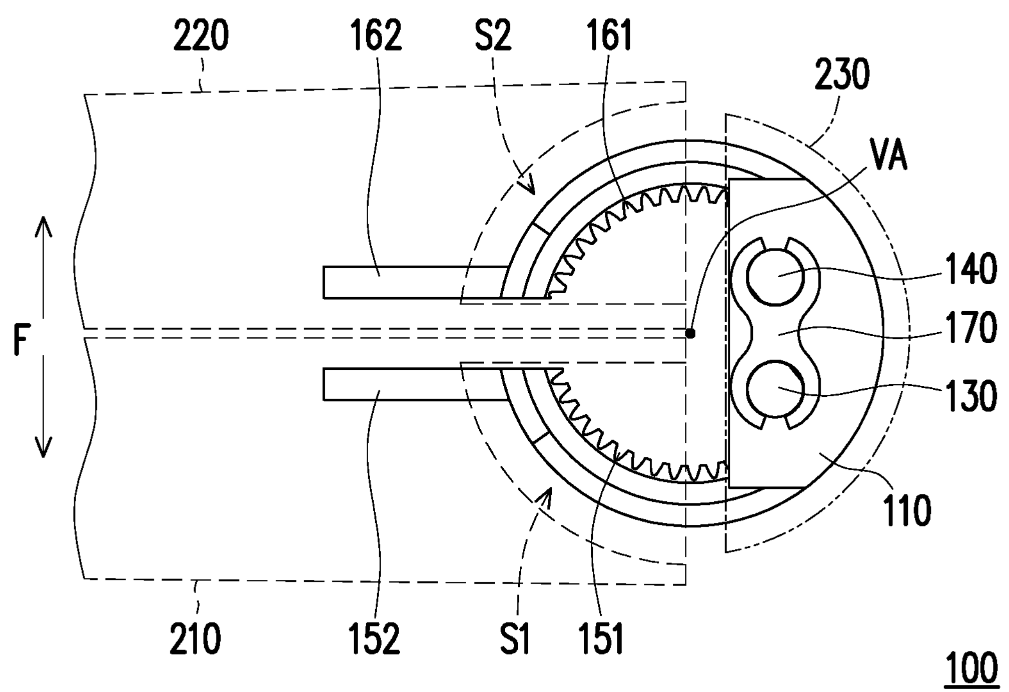
FIG. 3A is a schematic see-through view showing an electronic device adopting the hidden hinge of FIG. 2A being folded.
Figure 3B:
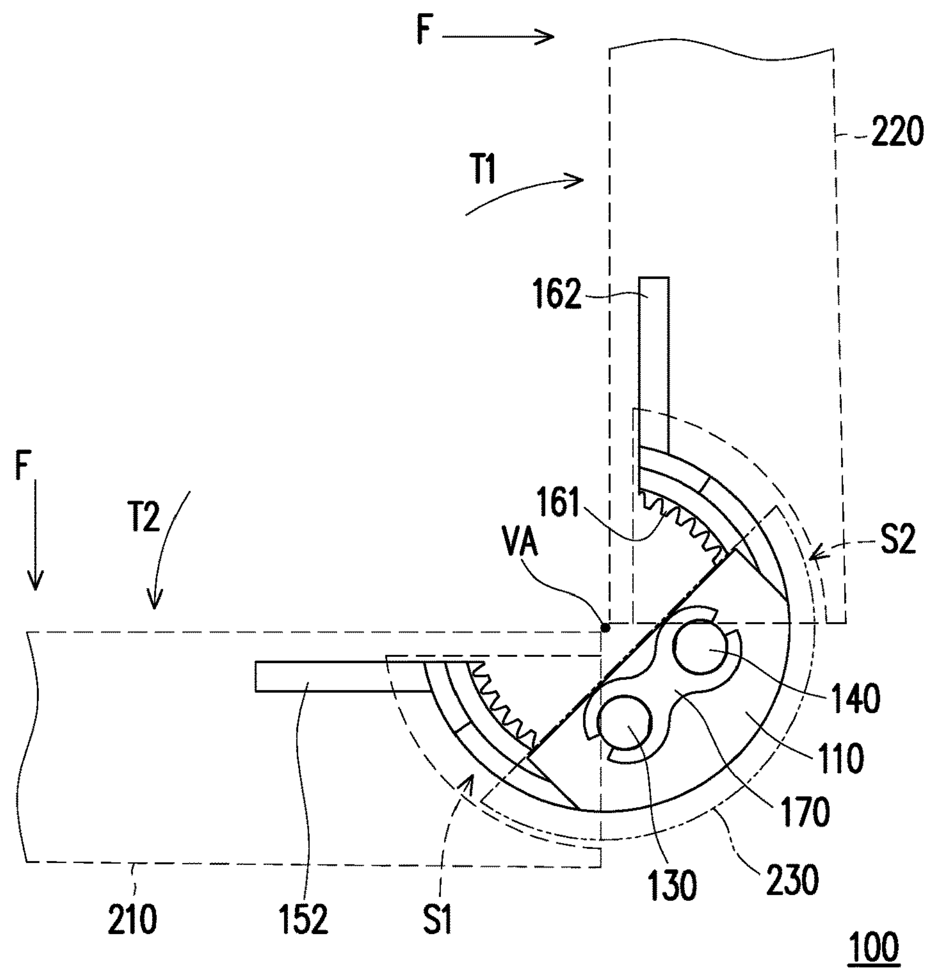
FIG. 3B is a schematic see-through view showing the electronic device of FIG. 3A being unfolded by 90 degrees.
Figure 3C:
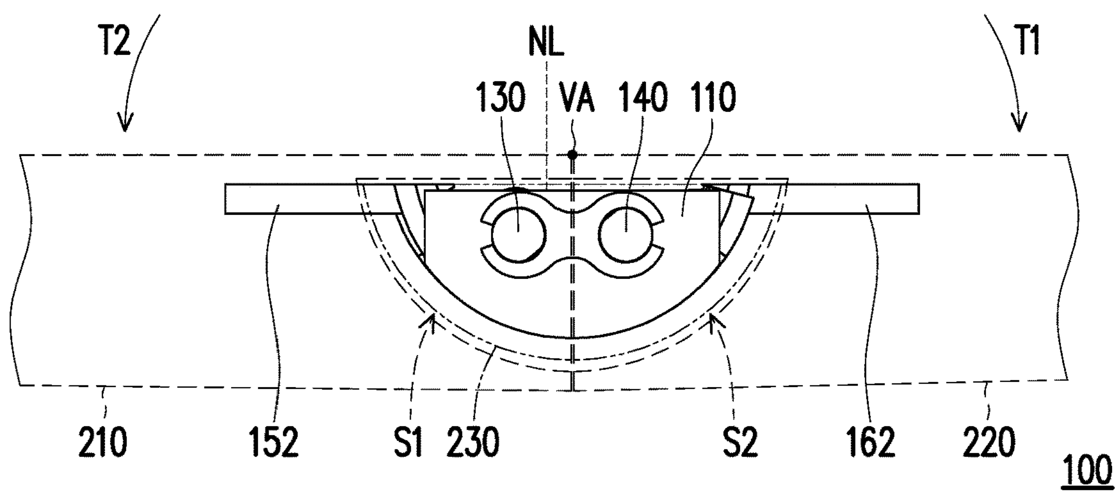
FIG. 3C is a schematic see-through view showing the electronic device of FIG. 3A being unfolded by 180 degrees.

FIG. 3A is a schematic see-through view showing an electronic device adopting the hidden hinge of FIG. 2A being folded. FIG. 3B is a schematic see-through view showing the electronic device of FIG. 3A being unfolded by 90 degrees. FIG. 3C is a schematic see-through view showing the electronic device of FIG. 3A being unfolded by 180 degrees.

Referring to FIG. 2A and FIG. 3A, the first bearing frame 150 is slidably disposed on the two first fixing frames 110 and has a first rack portion 151 and a first connection portion 152. The first rack portion 151 has a curved appearance and is configured to engage with the ring-shaped first teeth portion 131, and the first connection portion 152 of the first bearing frame 150 penetrates into the first space S1 to be fixed to the first body 210.

The second bearing frame 160 is slidably disposed on the two second fixing frames 120 and has a second rack portion 161 and a second connection portion 162. The second rack portion 161 has a curved appearance and is configured to engage with the ring-shaped second teeth portion 141, and the second connection portion 162 of the second bearing frame 160 penetrates into the second space S2 to be fixed to the second body 220.

Referring to FIG. 2A and FIG. 2B, in the present embodiment, the at least one torque member 170 includes two torque members 170 which are sleeved on the first rotating part 130 and the second rotating part 140. Specifically, one torque member 170 clamps the first rotating part 130 and the second rotating part 140 and protrudes from two end portions outside the first fixing frame 110, and the other torque member 170 clamps the first rotating part 130 and the second rotating part 140 and protrudes from two end portions outside the second fixing frame 120, to thereby provide the torque of the first rotating part 130 and the second rotating part 140 during pivotal rotation.

Referring to FIG. 2A and FIG. 2B, the first bearing frame 150 is adapted to slide along the two first fixing frames 110 and drive the first rotating part 130, and the second bearing frame 160 is adapted to slide along the two second fixing frames 120 and drive the second rotating part 140, such that the first bearing frame 150 and the second bearing frame 160 are pivotally rotated with a virtual axis VA as a center (referring to FIG. 3A to FIG. 3C) to drive the first body 210 and the second body 220 to fold or unfold with respect to each other. Referring to 3A to 3C, when the first body 210 and the second body 220 unfold with respect to each other, the protective casing 230 gradually enters the first space S1 and the second space S2, such that the first body 210 and the second body 220 abut against each other. When the first body 210 and the second body 220 fold with respect to each other, the protective casing 230 gradually leaves the first space S1 and the second space S2, such that the first body 210 and the second body 220 overlap with each other.

Referring to FIG. 2A and FIG. 2B, each first fixing frame 110 has a first sliding groove G1, the first bearing frame 150 has two first sliding blocks B1 facing the two first fixing frames 110, and the two first sliding blocks B1 are respectively disposed in the two first sliding grooves G1 of the two first fixing frames 110. Therefore, the two first sliding blocks B1 may slide along the two first sliding grooves G1, such that the first bearing frame 150 moves along a curved trajectory.

Each second fixing frame 120 has a second sliding groove G2, the second bearing frame 160 has two second sliding blocks B2 facing the two second fixing frames 120, and the two second sliding blocks B2 are respectively disposed in the two second sliding grooves G2 of the two second fixing frames 120. Therefore, the two second sliding blocks B2 may slide along the two second sliding grooves G2, such that the second bearing frame 160 moves along a curved trajectory.

Referring to FIG. 3A to FIG. 3C, the first bearing frame 150 and the second bearing frame 160 are adapted to rotate toward each other to switch to an unfolded state or a folded state. Specifically, when the first bearing frame 150 is rotated toward a first rotation direction T1 and the second bearing frame 160 is rotated toward a second rotation direction T2 opposite to the first rotation direction T1, it is switched to the unfolded state. When the first bearing frame 150 is rotated toward the second rotation direction T2 and the second bearing frame 160 is rotated toward the first rotation direction T1, it is switched to the folded state.

Each first fixing frame 110 has a first stopping block K1, and the first bearing frame 150 has two first limiting portions L1 which are oppositely disposed. When the first bearing frame 150 rotates toward the first rotation direction T1 and is perpendicular to a normal line NL of the first fixing frames 110, the two first limiting portions L1 respectively abut against the two first stopping blocks K1. Specifically, the first bearing frame 150 has been turned to a maximum angle (e.g., 90 degrees), and the angle may be adjusted according to the design requirements and is not limited thereto.

Each second fixing frame 120 has a second stopping block K2, and the second bearing frame 160 has two second limiting portions L2 which are oppositely disposed. When the second bearing frame 160 rotates toward the second rotation direction T2 and is perpendicular to a normal line NL of the second fixing frames 120, the two second limiting portions L2 respectively abut against the two second stopping blocks K2. Specifically, the second bearing frame 160 has been turned to a maximum angle (e.g., 90 degrees), and the angle may be adjusted according to the design requirements and is not limited thereto.

Referring to FIG. 2A and FIG. 2B, the first rotating part 130 includes a first driving shaft 132 and a first driven shaft 133. The first teeth portion 131 is formed around the first driving shaft 132. The second rotating part 140 includes a second driving shaft 142 and a second driven shaft 143. The second teeth portion 141 is formed around the second driving shaft 142. One torque member 170 clamps the first driving shaft 132 and the second driven shaft 143, and the other torque member 170 clamps the first driven shaft 133 and the second driving shaft 142.

A synchronous gear set 180 is further included and disposed between each first fixing frame 110 and each second fixing frame 120 which are adjacent to each other. Specifically, the synchronous gear set 180 has two main gears 181 and two auxiliary gears 182. The two main gears 181 are respectively connected to the first rotating part 130 and the second rotating part 140, and the two auxiliary gears 182 are pivotally connected to each first fixing frame 110 and each second fixing frame 120 which are adjacent to each other. Each main gear 181 is engaged with each auxiliary gear 182, and the two auxiliary gears 182 are engaged with each other. One main gear 181 is sleeved and fixed to the first driving shaft 132 and the first driven shaft 133, and the other main gear 181 is sleeved and fixed to the second driving shaft 142 and the second driven shaft 143.

In brief, through the effect of the synchronous gear set 180, the first bearing frame 150 and the second bearing frame 160 can be driven to synchronously unfold or fold.

Referring to FIG. 1A, FIG. 1B, and FIG. 3A to FIG. 3B, the hidden hinge 100 of the present embodiment will be described below. For example, when an external force F is applied to the second body 220, the second bearing frame 160 will be driven to pivotally rotate toward the first rotation direction T1 with the virtual axis VA as the center. Through the engagement relationship between the second rack portion 161 and the second teeth portion 141, the second bearing frame 160 drives the second rotating part 140 to turn along the second axis AX2. When the second rotating part 140 turns, through the two main gears 181 and two auxiliary gears 182, the first rotating part 130 is synchronously driven to turn along the first axis AX1, and the first bearing frame 150 is pivotally rotated toward the second rotation direction T2 with the virtual axis VA as the center.

Therefore, when the first body 210 and the second body 220 are unfolded to 90 degrees with respect to each other (see FIG. 3B), two ends of the protective casing 230 enter the first space S1 and the second space S2 at the same time. When the first body 210 and the second body 220 are unfolded to 180 degrees with respect to each other (see FIG. 3C), the two ends of the protective casing 230 completely enter the first space S1 and the second space S2, and the gap between the first body 210 and the second body 220 is reduced to the minimum.

Figure 4A:
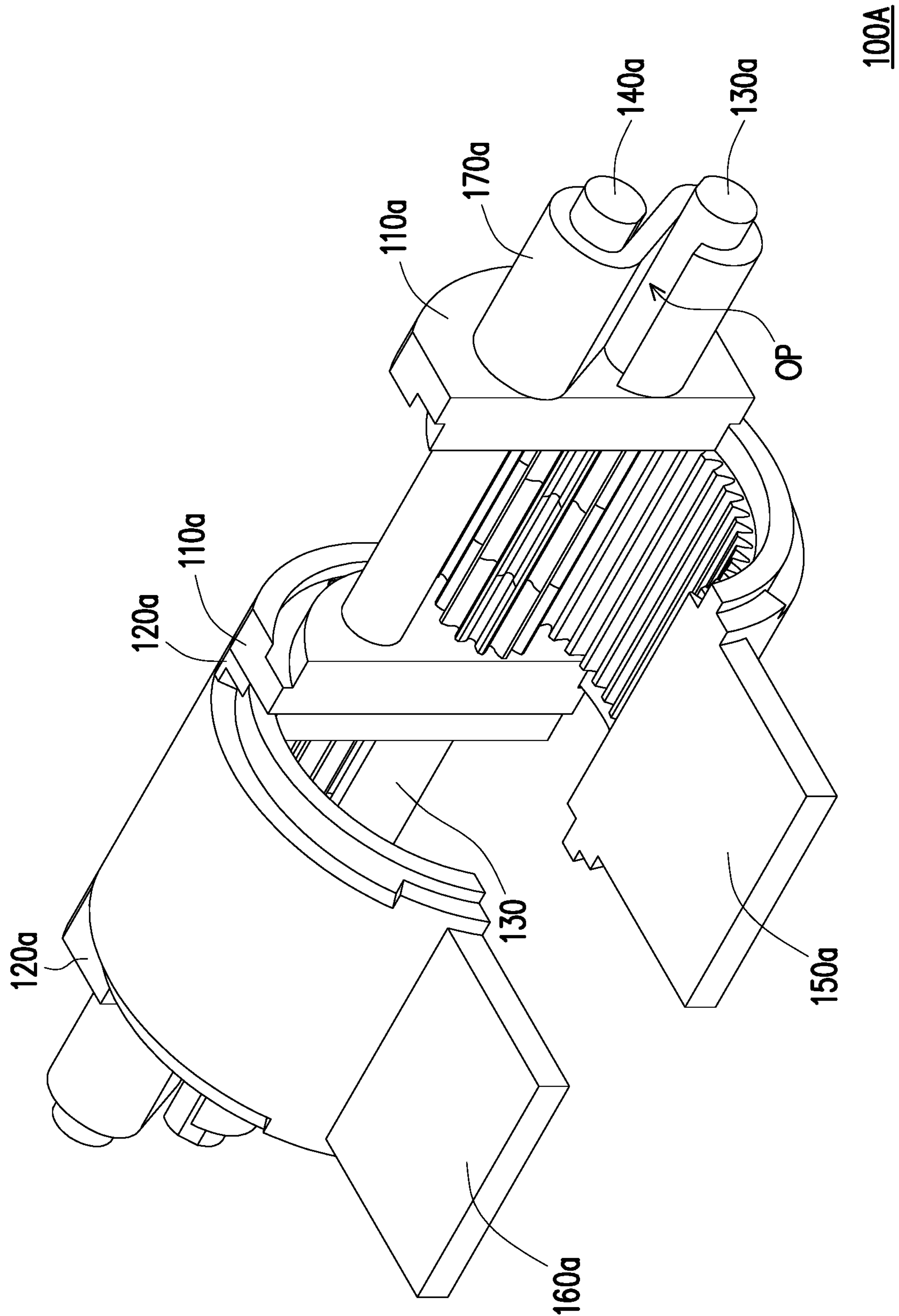
FIG. 4A is a schematic perspective view of a hidden hinge according to another embodiment of the invention.

FIG. 4A is a schematic perspective view of a hidden hinge according to another embodiment of the invention.

Referring to FIG. 4A, a hidden hinge 100A of the present embodiment is similar to the hidden hinge 100A of FIG. 2A. The difference lies in that the first fixing assembly and the second fixing assembly are partially attached to each other. Specifically, each first fixing frame 110*a* and each second fixing frame 120*a* which are adjacent to each other are attached to each other, and a first bearing frame 150*a* and a second bearing frame 160*a* are independently unfolded and folded.

Figure 4B:
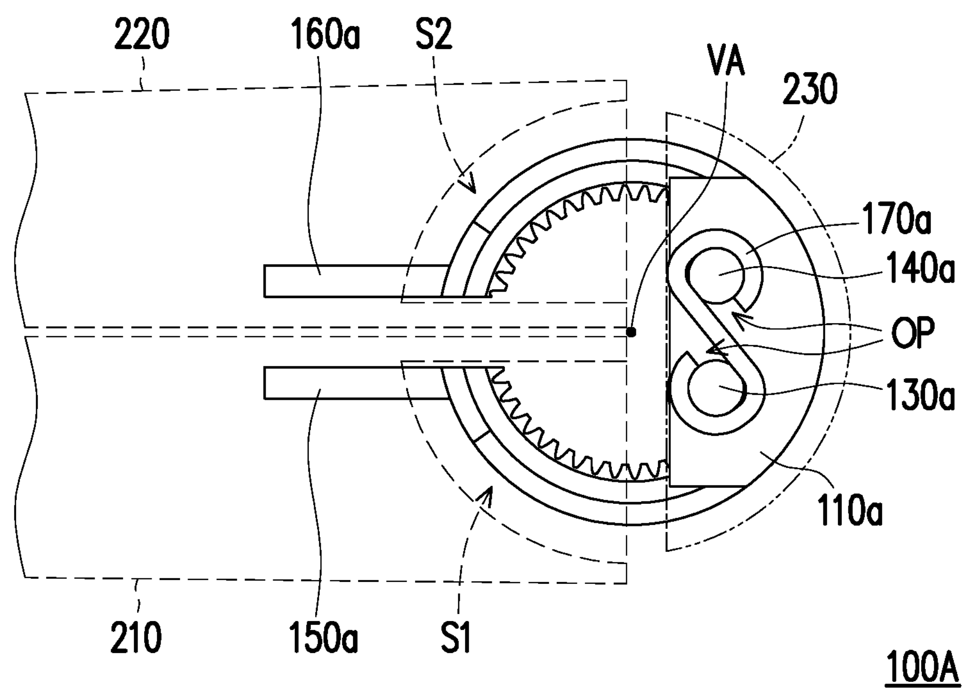
FIG. 4B is a schematic see-through view showing an electronic device adopting the hidden hinge of FIG. 4A being folded.
Figure 4C:
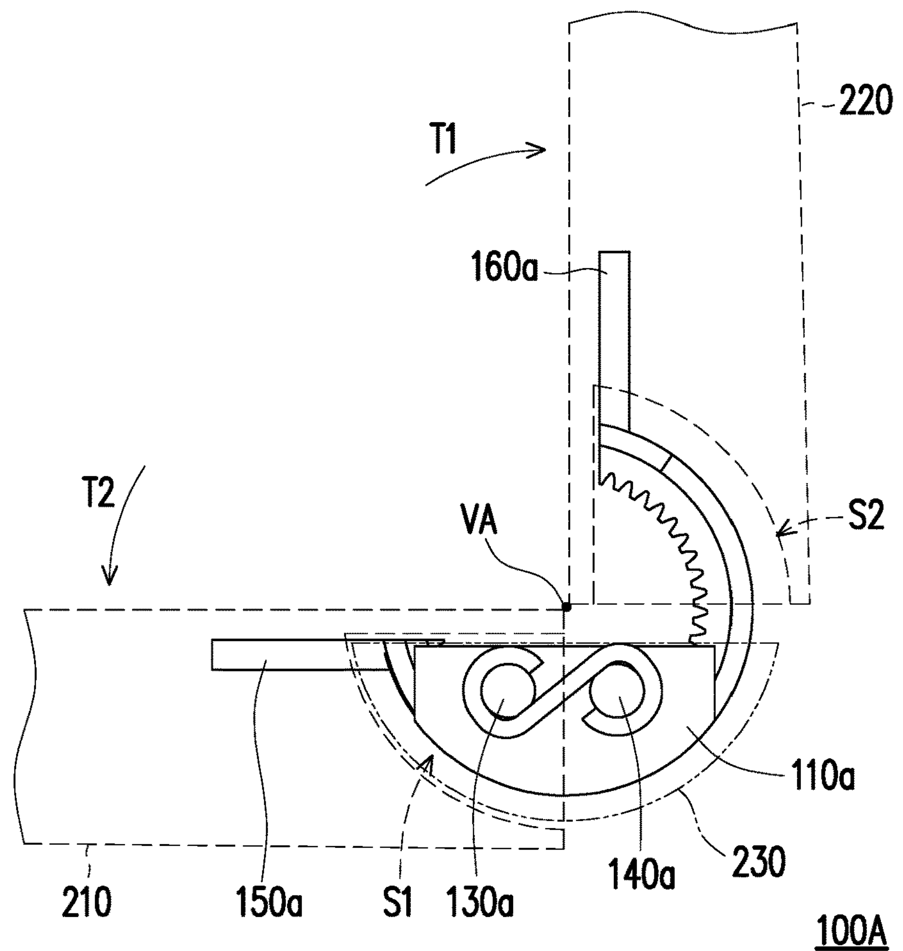
FIG. 4C is a schematic see-through view showing the electronic device of FIG. 4B being unfolded by 90 degrees.
Figure 4D:
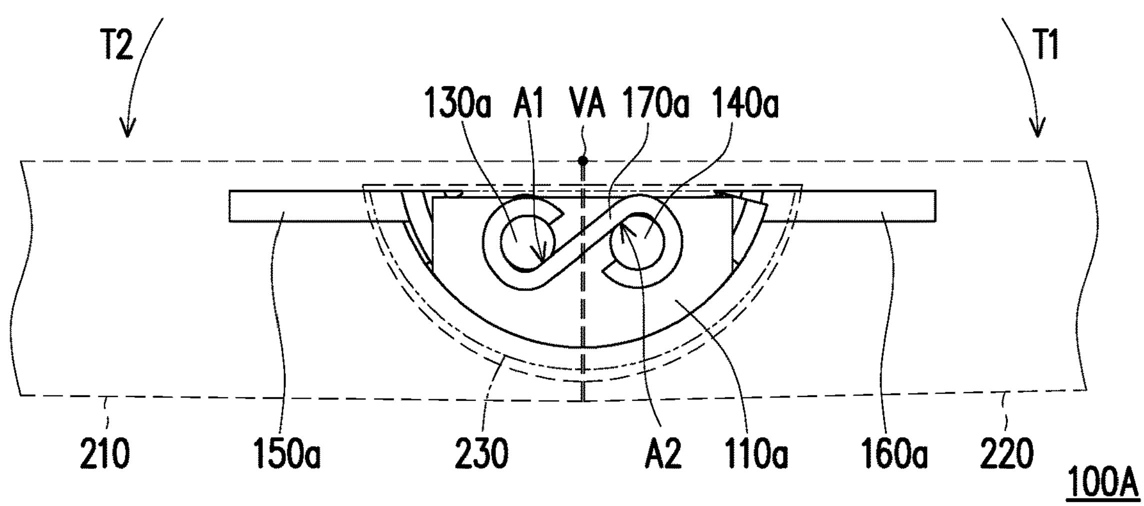
FIG. 4D is a schematic see-through view showing the electronic device of FIG. 4B being unfolded by 180 degrees.
Figure 4E:
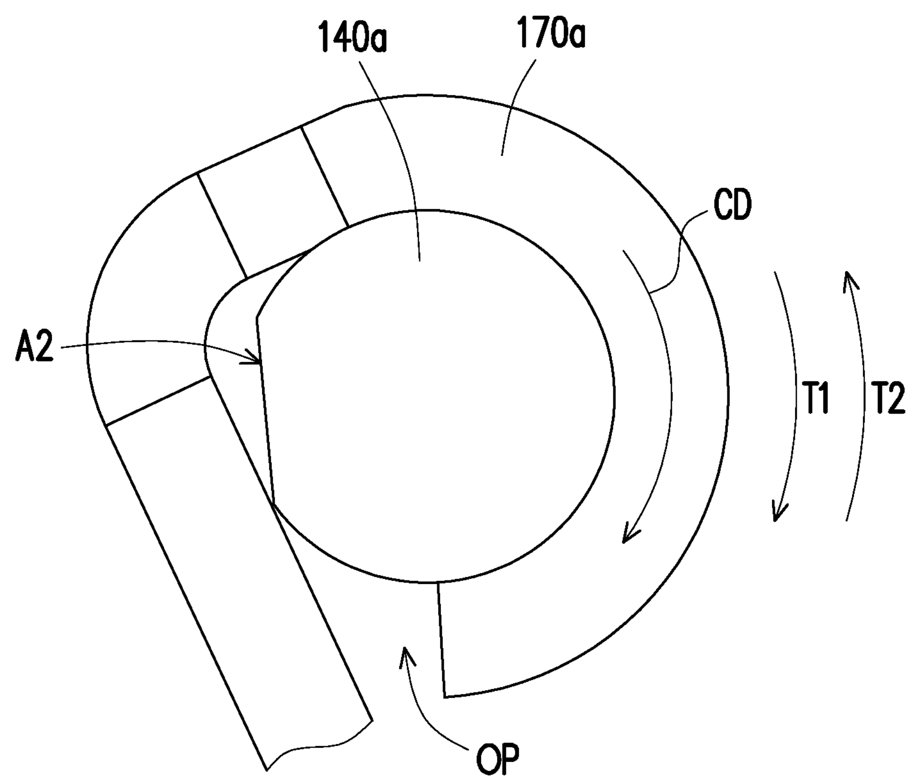
FIG. 4E is an enlarged view of a part of components of the hidden hinge of FIG. 4A.

FIG. 4B is a schematic see-through view showing an electronic device adopting the hidden hinge of FIG. 4A being folded. FIG. 4C is a schematic see-through view showing the electronic device of FIG. 4B being unfolded by 90 degrees. FIG. 4D is a schematic see-through view showing the electronic device of FIG. 4B being unfolded by 180 degrees. FIG. 4E is an enlarged view of a part of components of the hidden hinge of FIG. 4A.

Referring to FIG. 4B to FIG. 4D, the hidden hinge 100A has two torque members 170*a*. Each torque member 170*a* is configured in an S-shaped structure and has two openings OP. Each torque member 170*a* is characterized in that, when the rotation direction is the reverse direction of an extension direction CD of the torque member 170*a*, the torque is lighter, and when the rotation direction is the forward direction of the extension direction CD of the torque member 170*a*, the torque is heavier.

For example, referring to FIG. 4E, when the second rotating part 140*a* rotates toward the first rotation direction T1, the first rotation direction T1 is the forward direction of the extension direction CD, and the second rotating part 140*a* does not enlarge the opening OP of each torque member 170*a*, so the torque which each torque member 170*a* exerts on the second rotating part 140*a* is heavier. When the second rotating part 140*a* rotates toward the second rotation direction T2, the second rotation direction T2 is the reverse direction of the extension direction CD, and the second rotating part 140*a* is likely to push each torque member 170*a* to enlarge the opening OP, so the torque which each torque member 170*a* exerts on the second rotating part 140*a* is lighter.

Each torque member 170*a* clamps the first rotating part 130*a* and the second rotating part 140*a* which are parallel to each other. When the first bearing frame 150*a* and the second bearing frame 160*a* are unfolded with respect to each other (i.e., the second bearing frame 160*a* and the second rotating part 140*a* rotate toward the first rotation direction T1 and the first bearing frame 150*a* and the first rotating part 130*a* rotate toward the second rotation direction T2), the torque which each torque member 170*a* exerts on the first rotating part 130*a* is smaller than the torque which each torque member 170*a* exerts on the second rotating part 140*a*. Accordingly, the first bearing frame 150*a* and the first rotating part 130*a* are rotated first, and the protective casing 230 is entered into the first space S1 first. After the first bearing frame 150*a* and the two first fixing frames 110*a* abut against each other, the second bearing frame 160*a* and the second rotating part 140*a* are subsequently rotated, such that the second space S2 receives the other half of the protective casing 230.

When the first bearing frame 150*a* and the second bearing frame 160*a* are folded with respect to each other (i.e., the second bearing frame 160*a* and the second rotating part 140*a* are rotated toward the second rotation direction T2 and the first bearing frame 150*a* and the first rotating part 130*a* are rotated toward the first rotation direction T1), the torque which each torque member 170*a* exerts on the first rotating part 130*a* is greater than the torque which each torque member 170*a* exerts on the second rotating part 140*a*.

In brief, in the hidden hinge 100A of the present embodiment, through the torque difference of the torque member 170*a* clamped by different rotation directions, the first rotating part 130*a* and the second rotating part 140*a* are controlled to rotate in sequence to avoid irregular rotation of the first bearing frame 150*a* and the second bearing frame 160*a*.

Referring to FIG. 4B, FIG. 4D, and FIG. 4E, two ends of the first rotating part 130*a* respectively have a first bearing plane A1 and two ends of the second rotating part 140*a* respectively have a second bearing plane A2. Referring to FIG. 4E, when the second rotating part 140*a* rotates toward the first rotation direction T1, the second bearing plane A2 is suspended in the torque member 170*a*, and the torque member 170*a* is pushed to accumulate torque at this time. Referring to FIG. 4B and FIG. 4D, when the first bearing frame 150*a* and the second bearing frame 160*a* are switched to the unfolded state or the folded state, each first bearing plane A1 and each second bearing plane A2 are in contact with each torque member 170*a* to release the torque of each torque member 170*a*. This avoids accumulation of torque in the electronic device 200 in the unfolded state or the folded state, which may cause bending and twisting the first body 210 and the second body 220.

Figure 5A:
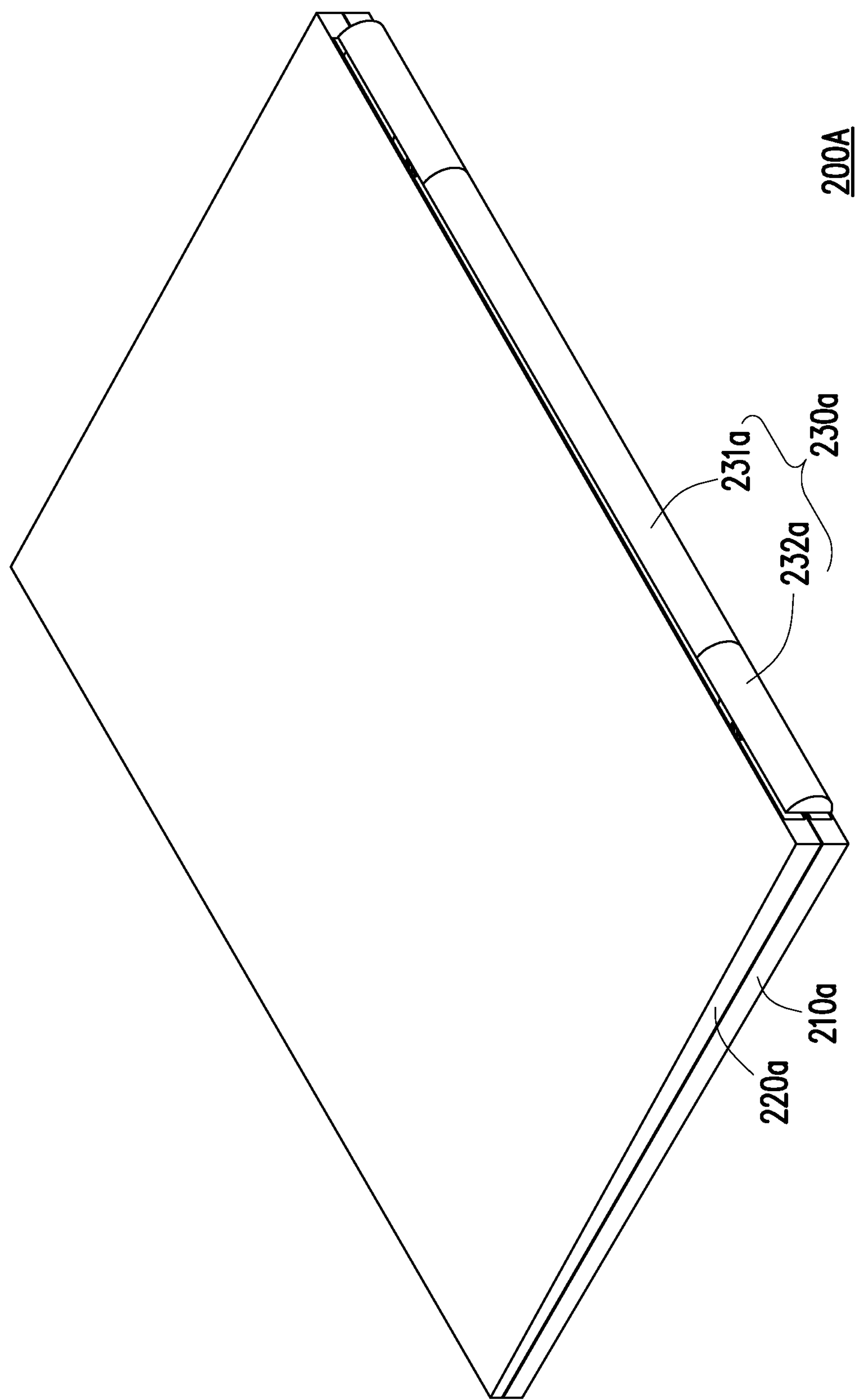
FIG. 5A is a schematic perspective view of an electronic device according to another embodiment of the invention.
Figure 5B:
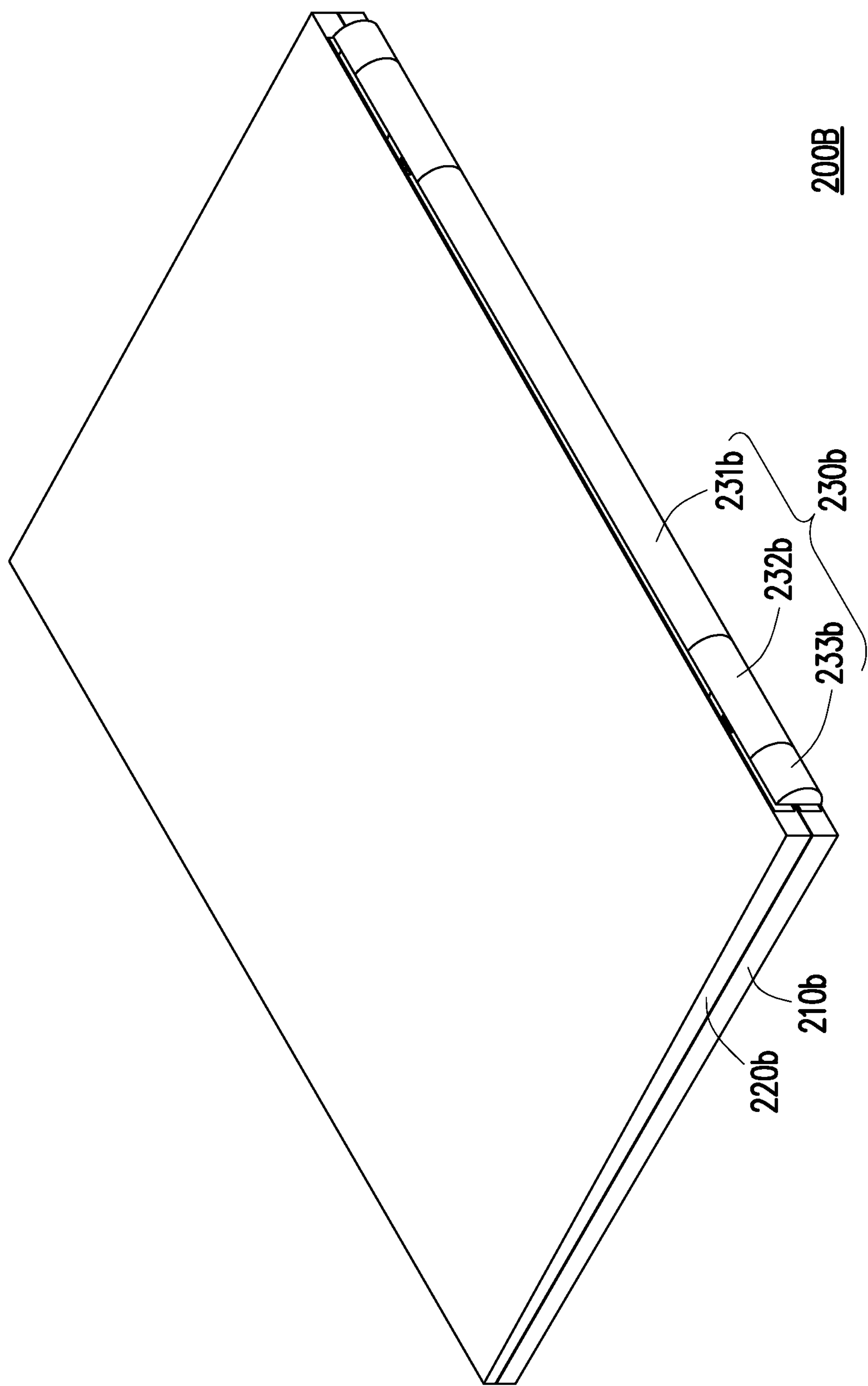
FIG. 5B is a schematic perspective view of an electronic device according to another embodiment of the invention.
Figure 5C:
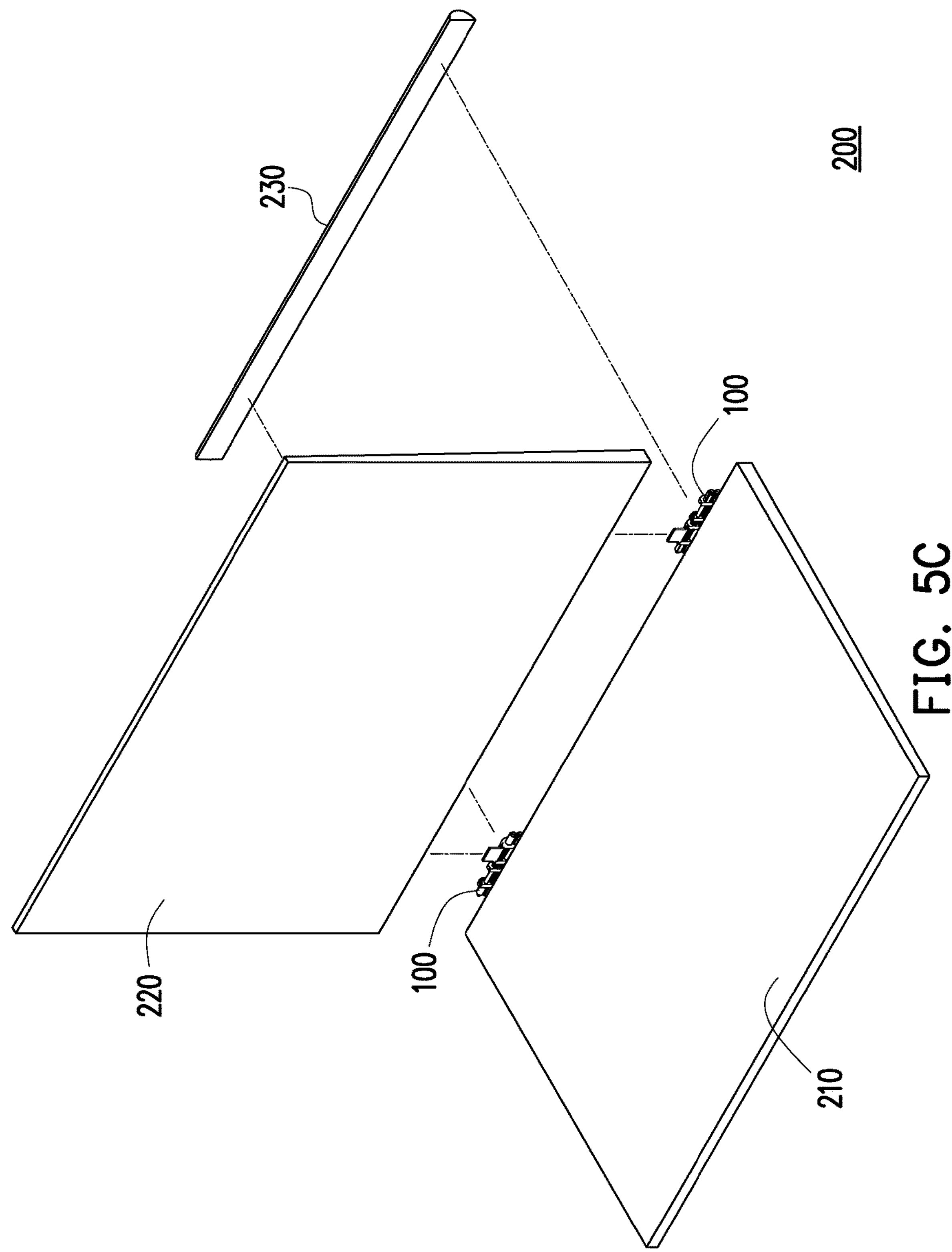
FIG. 5C is an exploded perspective view of the electronic device of the invention adopting a plug structure.

FIG. 5A is a schematic perspective view of an electronic device according to another embodiment of the invention. FIG. 5B is a schematic perspective view of an electronic device according to another embodiment of the invention. FIG. 5C is an exploded perspective view of the electronic device of the invention adopting a plug structure.

Referring to FIG. 5A, an electronic device 200A of the present embodiment is similar to the electronic device 200 shown in FIG. 1A. The difference lies in that a protective casing 230*a* of the electronic device 200A includes a long portion 231*a* and two intermediate portions 232*a*.

The two intermediate portions 232*a* respectively accommodate two hidden hinges, and the long portion 231*a* is connected between the two intermediate portions 232*a* and forms two gaps.

Referring to FIG. 5B, an electronic device 200B of the present embodiment is similar to the electronic device 200 shown in FIG. 1A. The difference lies in that a protective casing 230*b* of the electronic device 200B includes a long portion 231*b*, two intermediate portions 232*b*, and two short portions 233*b*. The two intermediate portions 232*a* respectively accommodate two hidden hinges, the long portion 231*b* is connected between the two intermediate portions 232*b* and forms two gaps, and the two short portions 233*b* are respectively connected to the outer sides of the two intermediate portions 232*b* and form two gaps.

Referring to FIG. 5C, the electronic device 200 of the present embodiment adopts, for example, a plug structure. In other words, the second body 220 and the two hidden hinges 100 are in a detachable form. Specifically, when the second body 220 is disassembled from the two hidden hinges 100, it may become a tablet computer and input control commands through touch.

Based on the above, in the hidden hinge of the invention, the first bearing frame is adapted to slide along the first fixing assembly and drive the first rotating part, and the second bearing frame is adapted to slide along the second fixing assembly and drive the second rotating part. Accordingly, the first bearing frame and the second bearing frame are pivotally rotated with a virtual axis as the center, such that the first bearing frame and the second bearing frame can be overlapped and unfolded with respect to each other.

Furthermore, the hidden hinge of the invention is configured to connect the first body and the second body of the electronic device. When the first bearing frame and the second bearing frame respectively drive the first body and the second body to unfold by 180 degrees with respect to each other, the hidden hinge and the protective casing can be hidden in the first body and the second body, and the first body and the second body can be abutted against each other to reduce the gap between the two to achieve a better narrow border display effect and improve the aesthetics of the electronic device.

What is claimed is:

1. A hidden hinge comprising:

a first fixing assembly;

a second fixing assembly, located on one side of the first fixing assembly;

a first rotating part and a second rotating part, rotatably disposed through the first fixing assembly and the second fixing assembly, wherein the first rotating part and the second rotating part are parallel to each other and respectively have a first teeth portion and a second teeth portion, and the first teeth portion and the second teeth portion are arranged in a vertically-staggered manner;

a first bearing frame, slidably disposed on the first fixing assembly and having a first rack portion engaged with the first teeth portion;

a second bearing frame, slidably disposed on the second fixing assembly and having a second rack portion engaged with the second teeth portion; and at least one torque member, sleeved around the first rotating part and the second rotating part, wherein the first bearing frame is adapted to slide along the first fixing assembly and drive the first rotating part, and the second bearing frame is adapted to slide along the second fixing assembly and drive the second rotating part, such that the first bearing frame and the second bearing frame are pivotally rotated with a virtual axis as a center, and the first fixing assembly has two first fixing frames, each of the first fixing frames has a first sliding groove, the first bearing frame has two first sliding blocks facing the two first fixing frames, the two first sliding blocks are respectively disposed in the two first sliding grooves, the second fixing assembly has two second fixing frames, each of the second fixing frames has a second sliding groove, the second bearing frame has two second sliding blocks facing the two second fixing assemblies, the two second sliding blocks are respectively disposed in the two second sliding grooves, and the first bearing frame and the second bearing frame are adapted to rotate toward each other to switch to an unfolded state or a folded state.

2. The hidden hinge according to claim 1, wherein each of the first fixing frames has a first stopping block, the first bearing frame has two first limiting portions which are oppositely disposed, and when the first bearing frame rotates toward a first rotation direction and is perpendicular to a normal line of each of the first fixing frames, the two first limiting portions respectively abut against the two first stopping blocks.

3. The hidden hinge according to claim 1, wherein each of the second fixing frames has a second stopping block, the second bearing frame has two second limiting portions which are oppositely disposed, and when the second bearing frame rotates toward a second rotation direction and is perpendicular to a normal line of each of the second fixing frames, the two second limiting portions respectively abut against the two second stopping blocks.

4. The hidden hinge according to claim 1, wherein the first rotating part comprises a first driving shaft and a first driven shaft, the first teeth portion is formed around the first driving shaft, the second rotating part comprises a second driving shaft and a second driven shaft, the second teeth portion is formed around the second driving shaft, and the at least one torque member comprises two torque members, wherein one of the torque members clamps the first driving shaft and the second driven shaft, and the other one of the torque members clamps the first driven shaft and the second driving shaft.

5. The hidden hinge according to claim 4, further comprising a synchronous gear set having two main gears and two auxiliary gears, wherein the two main gears are respectively connected to the first rotating part and the second rotating part, the two auxiliary gears are pivotally connected to each of the first fixing frames and each of the second fixing frames which are adjacent to each other, each of the main gears is engaged with each of the auxiliary gears, and the two auxiliary gears are engaged with each other.

6. The hidden hinge according to claim 5, wherein one of the main gears is sleeved and fixed to the first driving shaft and the first driven shaft, and the other one of the main gears is sleeved and fixed to the second driving shaft and the second driven shaft.

7. The hidden hinge according to claim 1, wherein the first fixing assembly and the second fixing assembly are partially attached to each other.

8. The hidden hinge according to claim 1, wherein the at least one torque member is configured in an S-shaped structure and has two openings, and the at least one torque member clamps the first rotating part and the second rotating part which are parallel to each other, wherein when the first bearing frame and the second bearing frame are unfolded with respect to each other, a torque which the at least one torque member exerts on the first rotating part is smaller than a torque which the at least one torque member exerts on the second rotating part, and when the first bearing frame and the second bearing frame are folded with respect to each other, a torque which the at least one torque member exerts on the first rotating part is greater than a torque which the at least one torque member exerts on the second rotating part.

9. The hidden hinge according to claim 1, wherein the first rotating part has at least one first bearing plane and the second rotating part has at least one second bearing plane, and when the first bearing frame and the second bearing frame are switched to an unfolded state or a folded state, the at least one first bearing plane and the at least one second bearing plane are in contact with a plane of the at least one torque member to release a torque of the at least one torque member.

10. An electronic device comprising:

a first body having a first space;

a second body having a second space;

a protective casing, aligned with the first space and the second space; and two hidden hinges, disposed in the protective casing and connecting the first body and the second body, wherein each of the hidden hinges comprises:

a first fixing assembly;

a second fixing assembly, located on one side of the first fixing assembly;

a first rotating part and a second rotating part, rotatably disposed through the first fixing assembly and the second fixing assembly, wherein the first rotating part and the second rotating part are parallel to each other and respectively have a first teeth portion and a second teeth portion, and the first teeth portion and the second teeth portion are arranged in a vertically-staggered manner;

a first bearing frame, slidably disposed on the first fixing assembly and having a first rack portion engaged with the first teeth portion, wherein the first bearing frame is fixed to the first body;

a second bearing frame, slidably disposed on the second fixing assembly and having a second rack portion engaged with the second teeth portion, wherein the second bearing frame is fixed to the second body; and at least one torque member, sleeved around the first rotating part and the second rotating part, wherein the first bearing frame is adapted to slide along the first fixing assembly and drive the first rotating part, and the second bearing frame is adapted to slide along the second fixing assembly and drive the second rotating part, such that the first bearing frame and the second bearing frame are pivotally rotated with a virtual axis as a center to drive the first body and the second body to fold or unfold with respect to each other, and when the first body and the second body unfold with respect to each other, the protective casing gradually enters the first space and the second space, such that the first body and the second body abut against each other, and the first fixing assembly has two first fixing frames, each of the first fixing frames has a first sliding groove, the first bearing frame has two first sliding blocks which are oppositely disposed, the two first sliding blocks are respectively disposed in the two first sliding grooves of the first fixing assembly, the second fixing assembly has two second fixing frames, each of the second fixing frames has a second sliding groove, the second bearing frame has two second sliding blocks which are oppositely disposed, the two second sliding blocks are respectively disposed in the two first sliding grooves of the second fixing assembly, and the first bearing frame and the second bearing frame are adapted to rotate toward each other to switch to an unfolded state or a folded state.

11. The electronic device according to claim 10, wherein each of the first fixing frames has a first stopping block, the first bearing frame has two first limiting portions which are oppositely disposed, and when the first bearing frame rotates toward a first rotation direction and is perpendicular to a normal line of each of the first fixing frames, the two first limiting portions respectively abut against the two first stopping blocks.

12. The electronic device according to claim 10, wherein each of the second fixing frames has a second stopping block, the second bearing frame has two second limiting portions which are oppositely disposed, and when the second bearing frame rotates toward a second rotation direction and is perpendicular to a normal line of each of the second fixing frames, the two second limiting portions respectively abut against the two second stopping blocks.

13. The electronic device according to claim 10, wherein the first rotating part comprises a first driving shaft and a first driven shaft, the first teeth portion is formed around the first driving shaft, the second rotating part comprises a second driving shaft and a second driven shaft, and the second teeth portion is formed around the second driving shaft, wherein one of the torque members clamps the first driving shaft and the second driven shaft, and another one of the torque members clamps the first driven shaft and the second driving shaft.

14. The electronic device according to claim 13, further comprising a synchronous gear set having two main gears and two auxiliary gears, wherein the two main gears are respectively connected to the first rotating part and the second rotating part, the two auxiliary gears are pivotally connected to each of the first fixing frames and each of the second fixing frames which are adjacent to each other, each of the main gears is engaged with each of the auxiliary gears, and the two auxiliary gears are engaged with each other.

15. The electronic device according to claim 14, wherein one of the main gears is sleeved and fixed to the first driving shaft and the first driven shaft, and the other one of the main gears is sleeved and fixed to the second driving shaft and the second driven shaft.

16. The electronic device according to claim 15, wherein the first fixing assembly and the second fixing assembly are partially attached to each other.

17. The electronic device according to claim 10, wherein the at least one torque member is configured in an S-shaped structure and has two openings, and the at least one torque member clamps the first rotating part and the second rotating part which are parallel to each other, wherein when the first bearing frame and the second bearing frame are unfolded with respect to each other, a torque which the at least one torque member exerts on the first rotating part is smaller than a torque which the at least one torque member exerts on the second rotating part, and when the first bearing frame and the second bearing frame are folded with respect to each other, a torque which the at least one torque member exerts on the first rotating part is greater than a torque which the at least one torque member exerts on the second rotating part.

18. The electronic device according to claim 10, wherein the first rotating part has at least one first bearing plane and the second rotating part has at least one second bearing plane, and when the first bearing frame and the second bearing frame are switched to an unfolded state or a folded state, the at least one first bearing plane and the at least one second bearing plane are in contact with a plane of the at least one torque member to release a torque of the at least one torque member.

* * * * *